(12) United States Patent
Cattet et al.

(10) Patent No.: US 10,321,341 B1
(45) Date of Patent: Jun. 11, 2019

(54) CHANNEL TRACKING IN A WIRELESS HOME NETWORK

(71) Applicant: Quantenna Communications, Inc., Fremont, CA (US)

(72) Inventors: Stephane Cattet, Paris (FR); Babak Soltanian, San Jose, CA (US); Sigurd Schelstraete, Menlo Park, CA (US); Vahbod Pourahmad, Pasadena, CA (US); Sam Heidari, Los Altos Hills, CA (US); Ali Rouhi, Oakland, CA (US); James Herbert, Hornsby (AU); Richard Kinder, Eastwood (AU)

(73) Assignee: QUANTENNA COMMUNICATIONS, INC., San Jose, CA (US)

( * ) Notice: Subject to any disclaimer, the term of this patent is extended or adjusted under 35 U.S.C. 154(b) by 156 days.

(21) Appl. No.: 15/047,610

(22) Filed: Feb. 18, 2016

Related U.S. Application Data (62) Division of application No. 13/374,131, filed on Dec. 12, 2011.

(Continued)

(51) Int. Cl.
| | |
|---|---|
| *H04W 24/00* | (2009.01) |
| *H04W 24/08* | (2009.01) |
| *H04B 7/0413* | (2017.01) |
| *H04W 36/18* | (2009.01) |
| *H04W 36/06* | (2009.01) |
| *H04W 84/12* | (2009.01) |
| *H04W 88/08* | (2009.01) |

(52) U.S. Cl.
CPC .......... *H04W 24/08* (2013.01); *H04B 7/0413* (2013.01); *H04W 36/06* (2013.01); *H04W 36/18* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 7,512,379 | B2 * | 3/2009 | Nguyen ................ | H04W 52/50 370/338 |
| 7,751,368 | B2 * | 7/2010 | Li ....................... | H04B 7/0632 370/332 |

(Continued)

*Primary Examiner* — Willie J Daniel, Jr.

(57) ABSTRACT

A wireless access point (WAP) configured to support a wireless home network among multiple wireless devices over a shared wireless communication medium on a selected channel. In an embodiment of the invention the WAP includes a channel tracker configured to track performance metrics over time for at least the selected channel; and to predict based on the tracked performance metrics at least one of: a predicted time of an impending channel changeover requirement in which a projected demand for the selected channel exceeds a projected capacity thereof and a predicted time of an impending monitoring interval for monitoring an unselected channel with relatively minimal disruption of communications on the selected channel. In another embodiment of the invention the WAP includes receive path components configured to concurrently process both communications on the selected channel together with monitored communications on an unselected channel.

8 Claims, 7 Drawing Sheets

Wi-Fi Access Point with Channel Tracking

Related U.S. Application Data

(60) Provisional application No. 61/422,610, filed on Dec. 13, 2010, provisional application No. 61/421,830, filed on Dec. 10, 2010.

(56) References Cited

U.S. PATENT DOCUMENTS

| | | | |
|---|---|---|---|
| 8,320,301 B2 * | 11/2012 | Walton | H04B 7/022 370/328 |
| 8,724,476 B2 | 5/2014 | Matsuura | |
| 8,886,197 B2 * | 11/2014 | Lindoff | H04W 36/0088 370/331 |

* cited by examiner

FIG. 1A

Smallville Wi-Fi Coverage

FIG. 1B

FIG. 2B  Wi-Fi Access Point with Channel Tracking

FIG. 2D Wi-Fi Access Point with Channel Tracking

Per Channel Performance Metric Aggregated History

FIG. 5

CHANNEL TRACKING IN A WIRELESS HOME NETWORK

CROSS REFERENCE TO RELATED APPLICATION

This application is a Divisional of prior filed Utility patent application Ser. No. 13/374,131 filed Dec. 12, 2011 entitled "Channel Tracking in a Wireless Home Network" which in turn claims the benefit of prior filed Provisional Applications No. 61/421,830 filed on Dec. 10, 2010 entitled "Channel Selection Algorithms" and No. 61/422,610 filed on Dec. 13, 2010 entitled "Radio Receiver Architecture for DFS" which are incorporated herein by reference in their entirety as if fully set forth herein.

BACKGROUND OF THE INVENTION

1. Field of Invention

The field of the present invention relates in general to Wi-Fi wireless access points (WAP) for home networks.

2. Description of the Related Art

Home networks are increasingly set up and serviced using a device called a Wireless Access Point (WAP). The WAP couples all the devices of the home network, e.g. computers, printers, televisions to one another and to the Cable or Subscriber Line through which Internet, video, and television is delivered to the home. Most WAPs implement the IEEE 802.11 standard which is a contention based standard for handling communications among multiple competing devices for a shared wireless communication medium. The WAP controls access to the shared communication medium using a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the line is in use. Collisions however are not easily detected in wireless home network communications, and therefore a competing links are subject to a further refinement identified as Collision Avoidance, in one form of which a link sends a request over the wireless medium which only elevates to actual data transmission if clearance to send is received from the target device. Thus the contention based protocol for wireless home networks is identified as Collision Sense Multiple Access/Collision Avoidance (CSMA/CA).

A WAP may be forced from time to time to change channels, due for example to oversubscription or channel degradation due to interference from neighboring WAPs. Additionally, in the more recent 802.11 standards such as 802.11n highly desirable broadband wireless channels formerly dedicated to military and civilian radar have been opened up to civilian home wireless usage with several provisos. First, a WAP upon selecting a new channel must monitor the channel for active radar for a full 60 seconds. Second, if radar is detected at any time the WAP must immediately vacate the channel and tear down its network. As a result of the required deference of residential WAPs to civilian and military radar it is frequently the case that channel changeovers are not transparent to users on the subject home network. Communications may be interrupted for one or two minutes during a changeover.

What is needed is a WAP with improved capability for channel changeover.

SUMMARY OF THE INVENTION

The present invention provides a method and apparatus for a wireless access point configured to support a wireless home network among multiple wireless devices over a shared wireless communication medium on a selected channel. In an embodiment of the invention the wireless access point includes a channel tracker. The channel tracker is configured to track performance metrics over time for at least the selected channel; and to predict based on the tracked performance metrics at least one of: a predicted time of an impending channel changeover requirement in which a projected demand for the selected channel exceeds a projected capacity thereof and a predicted time of an impending monitoring interval for monitoring an unselected channel with relatively minimal disruption of communications on the selected channel. In another embodiment of the invention the wireless access point includes receive path components configured to concurrently process both communications on the selected channel together with monitored communications on an unselected channel.

The invention may be implemented in hardware, firmware or software.

Associated methods and means are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

Figure 1A:
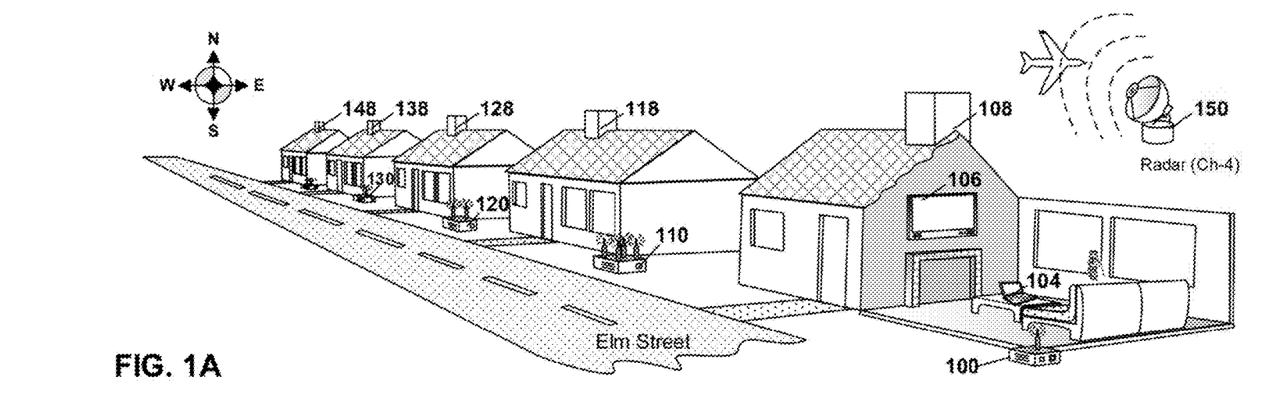
FIG. 1A shows a neighborhood with competing wireless access points (WAP)s.

FIG. 1A shows a neighborhood with competing residential wireless access points (WAP)s. A Wi-Fi network in residence 108 is enabled by WAP 100 which links wireless notebook computer 104, wireless Television 106 and other devices (not shown) within the home to one another and to the Internet (not shown). Throughout the following text and claims the phrase "wireless home network" shall be understood to include wireless local area networks (LAN) in: apartments, condominiums; businesses or enterprises. Residence 118 and its associated WAP 110, residence 128 and its associated WAP 120, residence 138 and its associated WAP 130, and residence 148 and its WAP 140 are also shown. An airport traffic control radar 150 is also shown proximate to the above discussed homes on 'Elm' street. This radar has exclusive access to that Channel "4" when active and any WAP previously using that Channel must immediately vacate the channel and tear down its associated residential network. Conversely when inactive Channel "4" can be used by one or more of the residential WAPs, provided they monitor the Channel for a full 60 seconds for any radar activity before setting up a Wi-Fi network. Each of the WAPs shown in FIG. 1 is equipped with the Channel Tracker of the current invention which minimizes Wi-Fi network disruptions by tracking performance metrics for both selected and monitored channels and by predicting based on the tracked performance metrics at least one of: an impending channel changeover requirement in which a projected demand for the selected channel exceeds a projected capacity thereof and or the upcoming time at which monitoring of other channels can take place, with relatively minimal disruption of communications on the selected channel.

Figure 1B:
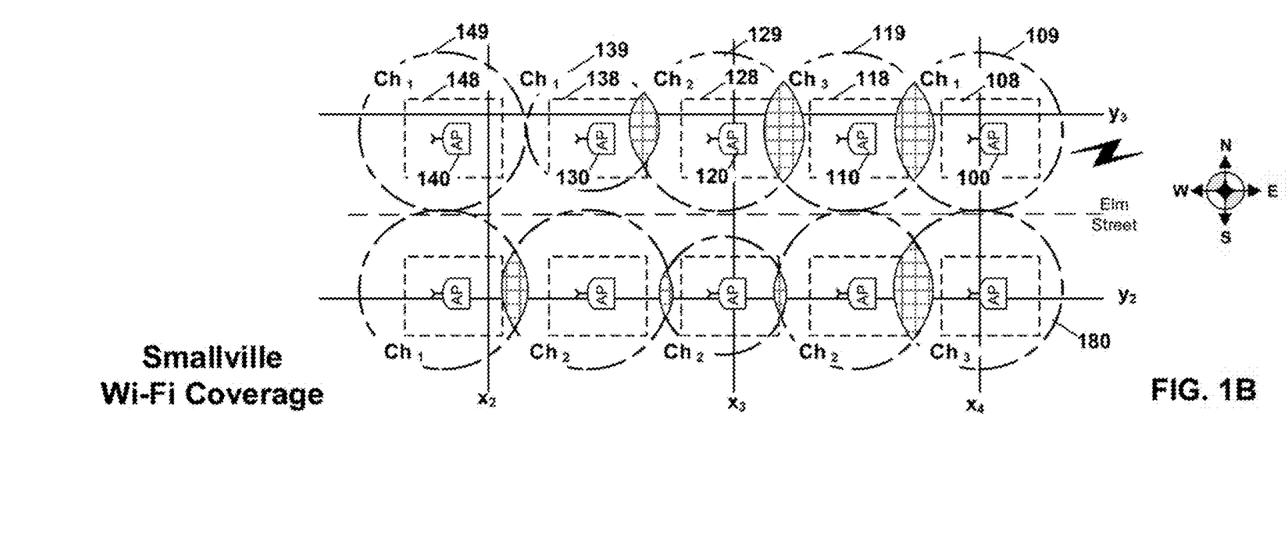
FIG. 1B is a network diagram showing the coverage of the WAPs shown in FIG. 1A.

FIG. 1B is a network diagram showing the coverage of the WAPs shown in FIG. 1A. The relative coverage of each WAP is shown as a concentric ring the diameter of which corresponds with the coverage area thereof. Areas of overlapping coverage are shown with cross-hatch. The coverage areas of WAPs 100, 110, 120, 130, 140 are shown with rings 109, 119, 129, 139, 149 respectively. Channels are seized on a first come first served basis. Typically, adjacent WAPS will select different channels if their coverage overlaps significantly.

Figure 2A:
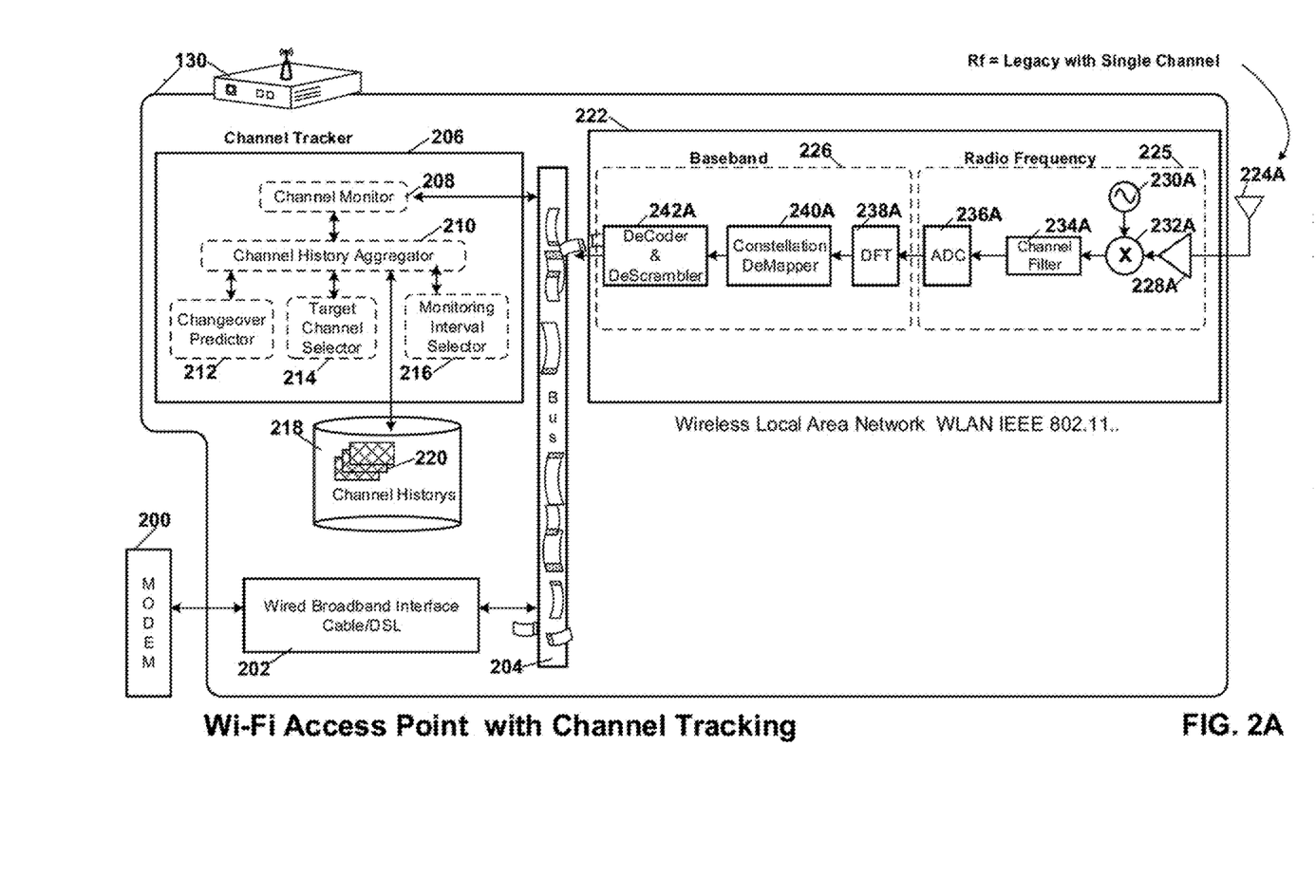
FIG. 2A is a hardware block diagram of the WAP 130 shown in FIG. 1A with a channel tracker coupled to a legacy receive path.

FIG. 2A is a hardware block diagram of the WAP 130 shown in FIG. 1A with a channel tracker coupled to a legacy receive path. In this embodiment of the invention the receive path is only capable of receiving one channel at a time, regardless of whether receive path components include one or more than one antenna. The channel tracker helps to reduce network disruptions by tracking performance metrics for both selected and monitored channels and by predicting based on the tracked performance metrics: both an impending channel changeover requirement in which a projected demand for the selected channel exceeds a projected capacity thereof and an upcoming time at which the changeover can take place with relatively minimal disruption of communications on the selected channel. WAP 130 is shown. An associated cable or Digital Subscriber Line (DSL) modem 200 is shown coupled to the wired broadband interface 202 of the WAP. The broadband interface couples to the packet based bus 204 to provide upstream and downstream communications between the devices of the associated home network and the Internet. The receive path components include an antenna 224A coupled to Radio Frequency (Rf) module 225 and baseband module 226 of the wireless local area network (WLAN) stage 222, which implements the IEEE 802.11 standard.

The Rf module includes: a low noise amplifier (LNA) 228A with an input coupled to antenna 224A and an output coupled to a down converter. The down converter comprises a tunable oscillator 230A and a mixer 232A. Channel filter 234A couples to the mixer output to filter out a selected data channel or selected monitor channel for further processing. The filtered data/monitor channel is subject to analog-to-digital conversion (ADC) in ADC 236A. The output of the ADC couples to the input of the baseband module 226 and specifically the Discrete Fourier Transform (DFT) component 238A which converts the received communications from the time domain to the frequency domain. The constellation demapper 240A takes the complex number outputs from the DFT and de maps them to corresponding bits, which are then decoded and descrambled in decoder and descrambler components 242A. The channel tracker harvests relevant performance metrics from either or both the communications with the various stations on the selected channel, as well as performance metrics from the monitored channels.

The channel tracker 206 is coupled to the packet bus 204 for receipt of selected communications from the selected data channel or monitored channel(s). The channel tracker includes a channel monitor 208, a channel history aggregator 210, a changeover predictor 212, a target channel selector 214 and a monitoring interval selector 216. The channel tracker also includes storage 218 for storing the history of the observed performance metrics from all channels 220 selected by the WAP for service or monitoring over an extended time interval.

The channel monitor 208 harvests relevant performance metrics from either or both the data channel and the monitored channel(s). The channel history aggregator 210 orders the parameters according to time-stamp and channel and stores them in storage 218 as individual channel histories 220. The channel history aggregator in an embodiment of the invention maintains a rolling history days or weeks in length for the selected channel and for monitored channels. Performance metrics/parameters stored in storage 218 for the selected channel may include one or more of the following: a modulation capability; a multiple-input multiple-output (MIMO) capability; a number of active stations; power level; a received signal strength (RSSI); power; energy; radar; number of stations; utilization; packet error rate; queue length; data rate; loading; noise level; signal-to-noise ratio; and a number of received packets having foreign service set identifiers (SSID)s for example. These statistics may further be collected either in the aggregate for an entire WAP network or on a per link basis for each station to which the WAP is linked. Slightly less information is typically available for monitored channels, but many beacons provide in addition to channel, power, RSSI, SSID, radar and capabilities, additional information such as loading and number of active stations. Still further information is available if the monitoring WAP impersonates a station within the monitored network.

The changeover predictor 212 calculates trend lines based on the stored performance metric(s) history for the selected channel and determines based thereon when a changeover from the selected channel to another channel may be required. The target channel selector 214 determines based on the stored performance metrics for the non-selected channels which among the non-selected channels appears most suitable for migrating the network and associated devices. In this embodiment of the invention the monitoring interval selector 216 determines an optimal time for monitoring another channel based on the stored performance parameter history for the selected channel. This time is selected to minimize disruption or slowdown of communications on the selected channel. In another embodiment of the invention the monitoring interval selector determines the best time within the remaining time identified by the changeover predictor in which to monitor and changeover to a target channel identified by the target channel selector. During or after a channel changeover, the changeover predictor 212 is again active to determine if based on historical patterns there are any orphan stations that did not participate in the changeover. If such is the case, another changeover may be predicted thereby.

Figure 2B:
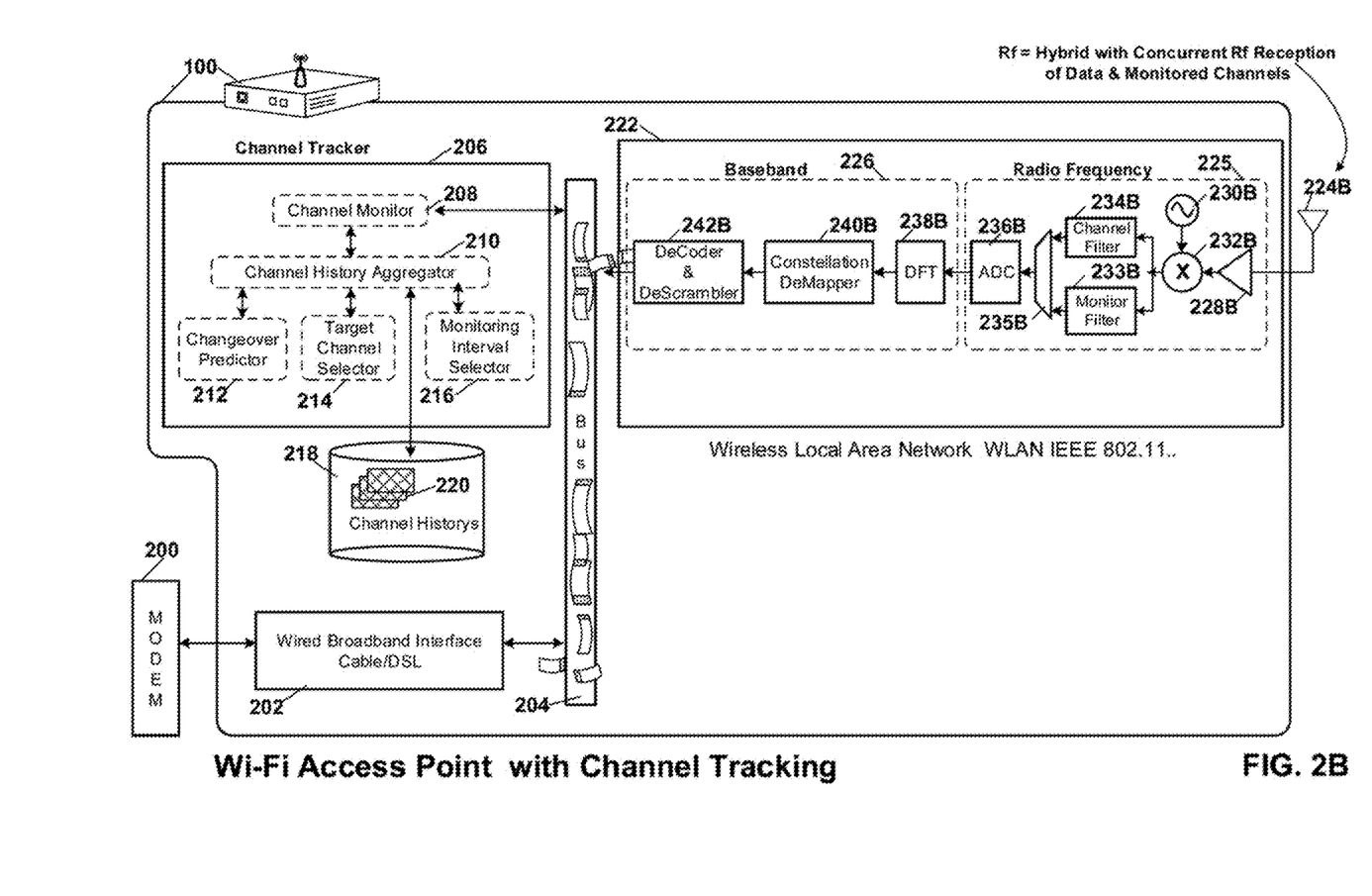
FIG. 2B is a hardware block diagram of the WAP 100 shown in FIG. 1A with a channel tracker coupled to a hybrid receive path for concurrent reception of a data channel and a monitored channel.

FIG. 2B is a hardware block diagram of the WAP 100 shown in FIG. 1A with the channel tracker discussed above in connection with FIG. 2A coupled to a hybrid receive path of the WLAN stage 222 for concurrent reception of a data channel and a monitored channel. For the sake of clarity components having similar function to those discussed above in FIG. 2A will carry the same reference number where the functionality is substantially the same as described above, and may additionally include a distinguishing alphabetical suffix where required.

The receive path components include an antenna 224B coupled to Rf module 225 and baseband module 226 of the WLAN stage 222, which implements the IEEE 802.11 standard.

The Rf module includes: LNA 228B with an input coupled to antenna 224B and an output coupled to a down converter.

In an embodiment of the invention the down converter comprises a tunable oscillator 230B and a mixer 232B. Two filters, a first 234B for the selected Channel, and a second 233B for the monitored channel are coupled in parallel to the mixer output to concurrently filter out the selected data channel and selected monitor channel for further processing. The output of each filter is multiplexed by multiplexer 235B into ADC 236B.

In an other embodiment of the invention the down converter comprises two mixer and oscillator pairs with the input of each mixer coupled in common to the output of the LNA, and with the output of each mixer coupled to an associated one of the channel and monitor filters. The output of each filter is multiplexed by multiplexer 235B into ADC 236B.

The filtered data channel and monitor channel are subject to analog-to-digital conversion in ADC 236B. The output of the ADC couples to the input of the baseband module 226 and specifically the Discrete Fourier Transform (DFT) component 238B which converts the received communications from the time domain to the frequency domain. The constellation demapper 240B takes the complex number outputs from the DFT and de maps them to corresponding bits, which are then decoded and descrambled in decoder and descrambler components 242B. The channel tracker 206 harvests relevant performance metrics from both the communications with the various stations on the selected channel, as well as performance metrics from the monitored channels. The channel tracker performs in the manner discussed above in connection with FIG. 2A, albeit with less vulnerability to outright network disruption due to the presence of the means for concurrent monitoring of a selected data channel and a target channel for monitoring.

Figure 2C:
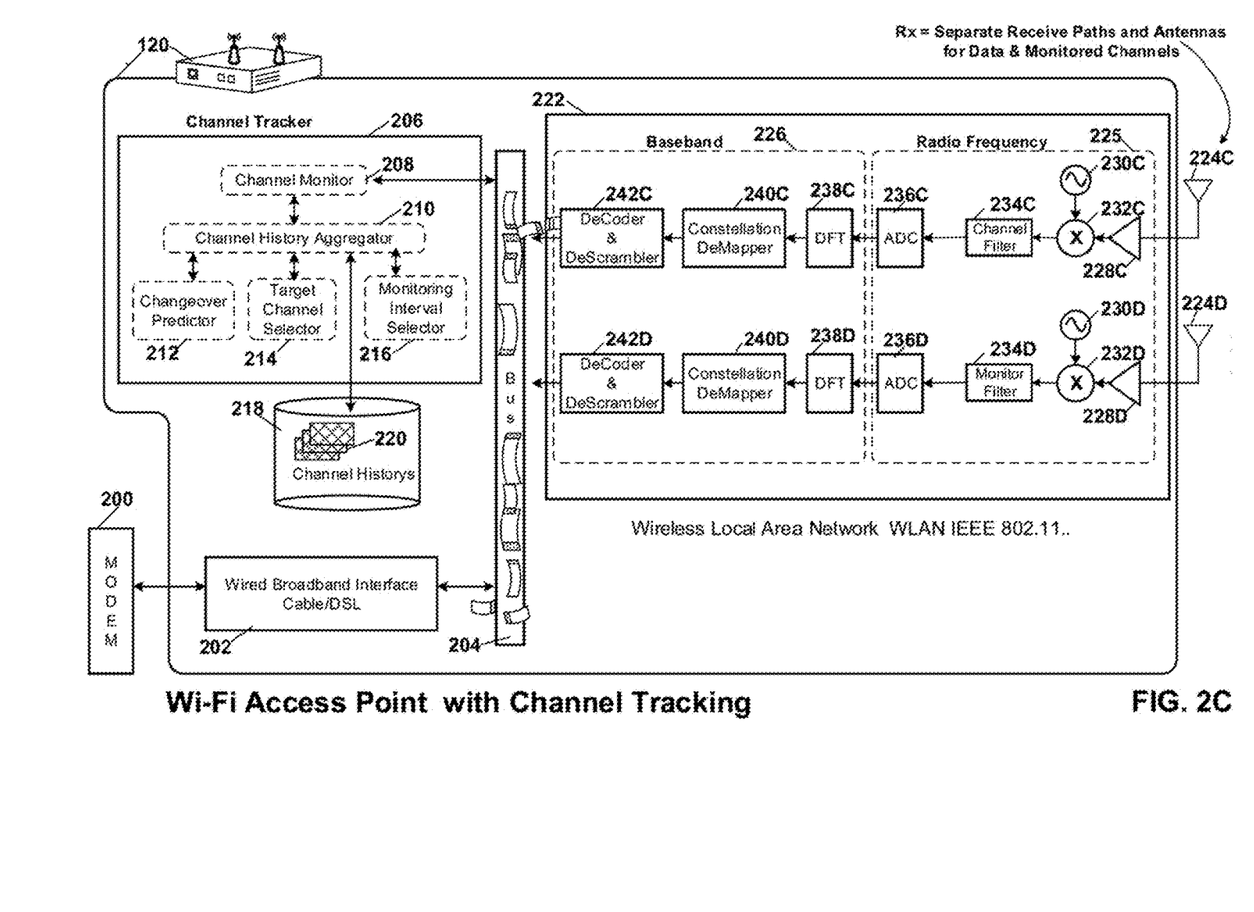
FIG. 2C is a hardware block diagram of the WAP 120 shown in FIG. 1A with a channel tracker coupled to discrete receive paths for concurrent reception of a data channel and a monitored channel.

FIG. 2C is a hardware block diagram of the WAP 120 shown in FIG. 1A with a channel tracker discussed above in connection with FIG. 2A coupled to discrete receive paths of the WLAN stage 222 for concurrent reception of a data channel and a monitored channel. For the sake of clarity components having similar function to those discussed above in FIG. 2A will carry the same reference number where the functionality is substantially the same as described above, and may additionally include a distinguishing alphabetical suffix where required.

The receive path components include antennas 224C, 224D coupled to Rf module 225 and baseband module 226 of the WLAN stage 222, which implements the IEEE 802.11 standard.

The WLAN stage includes two discrete receive paths. The selected channel receive path components originate with the data channel antenna 224C, and include: LNA 228C, the tunable oscillator 230C and mixer 232C which down convert the received data channel, for filtration by the channel filter 234C, conversion in the ADC 236C, domain conversion in the DFT 238C, demapping in the constellation demapper 240C and decoding and descrambling in the decoder and descrambler 242C which couples to the packet based bus 204.

The monitored channel receive path components originate with the monitor channel antenna 224D, and include: LNA 228D, the tunable oscillator 230D and mixer 232D which down convert the received monitored channel, for filtration by the monitor filter 234D, conversion in the ADC 236D, domain conversion in the DFT 238D, demapping in the constellation demapper 240D and decoding and descrambling in the decoder and descrambler 242D which couples to the packet based bus 204. The monitored channel components are generally less precise than those associated with the selected channel given the low speed communication requirements thereof.

The channel tracker 206 harvests relevant performance metrics from both the communications with the various stations on the selected channel, as well as performance metrics from the monitored channels. The channel tracker performs in the manner discussed above in connection with FIG. 2A, albeit with less vulnerability to outright network disruption due to the presence of the means for concurrent monitoring of a selected data channel and a target channel for monitoring.

Figure 2D:
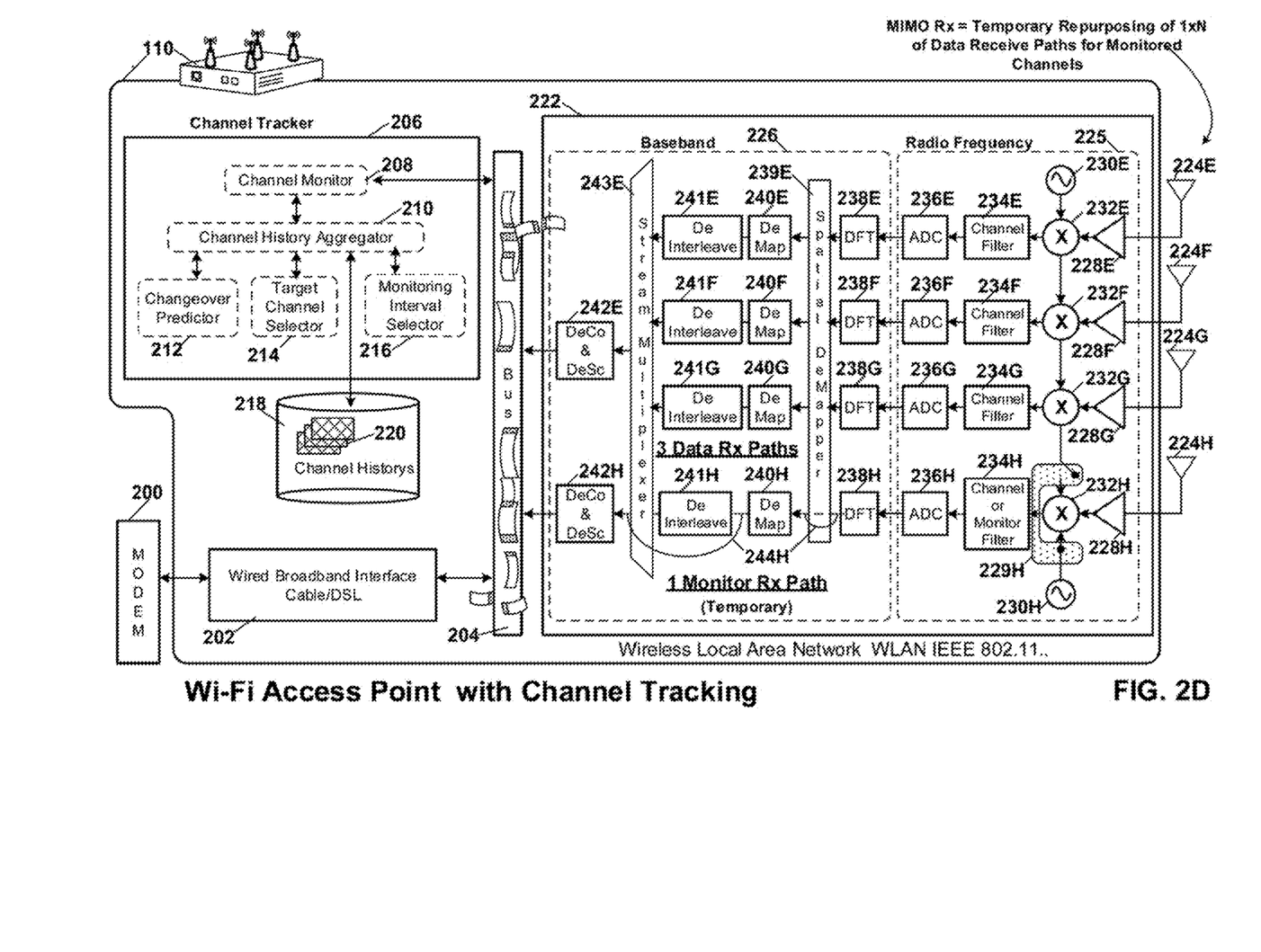
FIG. 2D is a hardware block diagram of the multiple-input multiple-output (MIMO) WAP 110 shown in FIG. 1A with a channel tracker coupled to MIMO receive paths for concurrent reception of a data channel and a monitored channel.

FIG. 2D is a hardware block diagram of the multiple-input multiple-output (MIMO) WAP 110 shown in FIG. 1A with a channel tracker discussed above in connection with FIG. 2A coupled to MIMO receive paths of the WLAN stage 222 for concurrent reception of a data channel and a monitored channel. For the sake of clarity components having similar function to those discussed above in FIG. 2A will carry the same reference number where the functionality is substantially the same as described above, and may additionally include a distinguishing alphabetical suffix where required.

The MIMO receive path components include antennas 224E, 224F, 224G, 224H coupled to Rf module 225 and baseband module 226 of the WLAN stage 222, which implements the IEEE 802.11 standard.

The WLAN stage includes four discrete MIMO receive paths. One of which is intermittently switchable on demand for monitoring a target channel. A first MIMO receive path originates with the antenna 224D, and includes: LNA 228E, the tunable oscillator 230E and mixer 232E which down convert the received data channel, for filtration by the channel filter 234E, conversion in the ADC 236E, domain conversion in the DFT 238E, spatial demapping in spatial demapper 239E, demapping in the constellation demapper 240E, deinterleaving in deinterleaver 241E, multiplexing in stream multiplexer 243E and decoding and descrambling in the decoder and descrambler 242E which couples to the packet based bus 204.

The second MIMO receive path originates with the antenna 224F, and includes: LNA 228F, the shared tunable oscillator 230E and mixer 232F which down convert the received data channel, for filtration by the channel filter 234F, conversion in the ADC 236F, domain conversion in the DFT 238F, spatial demapping in spatial demapper 239E, demapping in the constellation demapper 240F, deinterleaving in deinterleaver 241F, multiplexing in stream multiplexer 243E and decoding and descrambling in the shared decoder and descrambler 242E which couples to the packet based bus 204.

The third MIMO receive path originates with the antenna 224G, and includes: LNA 228G, the shared tunable oscillator 230E and mixer 232G which down convert the received data channel, for filtration by the channel filter 234G, conversion in the ADC 236G, domain conversion in the DFT 238G, spatial demapping in spatial demapper 239E, demapping in the constellation demapper 240G, deinterleaving in deinterleaver 241G, multiplexing in stream multiplexer 243E and decoding and descrambling in the shared decoder and descrambler 242E which couples to the packet based bus 204.

The fourth MIMO receive path is a hybrid, switchably allocable either to MIMO demodulation of the received data channel along with the other three MIMO receive paths or intermittently under control of the channel tracker to single antenna monitoring of communications on a target channel. This hybrid receive path originates with the antenna 224H, and includes: LNA 228G, a switchable connection 229H either to the shared tunable oscillator 230E and mixer 232H in "MIMO" mode or to discrete tunable oscillator 230H and mixer 232H for in channel "Monitor" mode. The down converted channel, i.e. monitor or MIMO data is subject to filtration by the channel or monitor filter 234H, conversion in the ADC 236H, and domain conversion in the DFT 238H.

In MIMO mode spatial demapping is again accomplished by the spatial demapper 239E, demapping in the constellation demapper 240H, deinterleaving in deinterleaver 241H, multiplexing in stream multiplexer 243E and decoding and descrambling in the shared decoder and descrambler 242E which couples to the packet based bus 204.

In Monitor mode the output of the DFT is directly coupled to the input of the constellation demapper 240H. The output of the constellation demapper is input directly to the decoder and descrambler 242H without deinterleaving or multiplexing. The decoder and descrambler 242H couples to the packet based bus 204.

The channel tracker 206 harvests relevant performance metrics from both the MIMO communications with the various stations on the selected channel, as well as performance metrics from the monitored channels. The channel tracker performs in the manner discussed above in connection with FIG. 2A, albeit with less vulnerability to outright network disruption due to the presence of the means for concurrent monitoring of a selected data channel and a target channel for monitoring.

Figure 3:
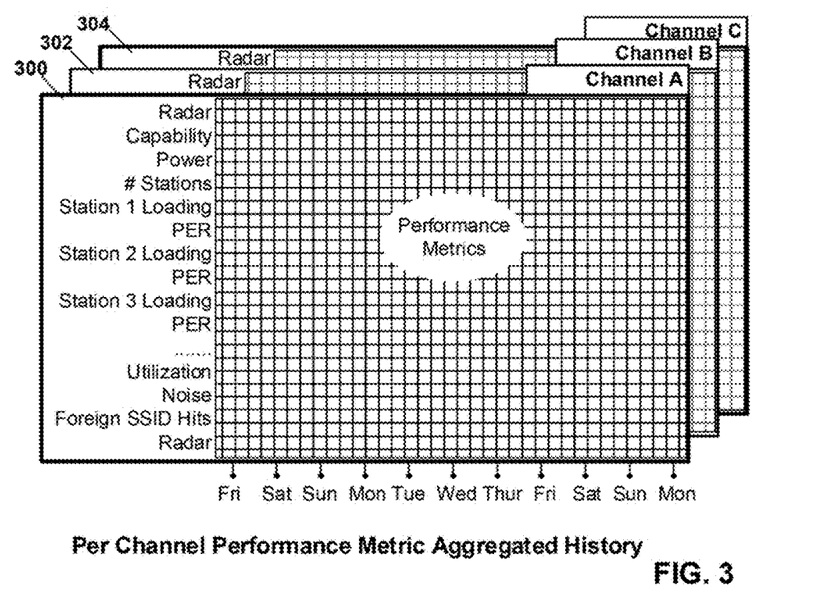
FIG. 3 is a data diagram of historical records for selected and monitored channels maintained by the channel tracker shown in FIGS. 2A-2D.

FIG. 3 is a data diagram of historical records for selected and monitored channels maintained by the channel tracker shown in FIGS. 2A-2D. Histories 300, 302, 304 for channels A, B, C respectively are shown.

Performance metrics/parameters in the historical records of the selected channel may include one or more of the following: a modulation capability; a multiple-input multiple-output (MIMO) capability; a number of active stations; power level; a received signal strength (RSSI); power; energy; radar; number of stations; utilization; packet error rate; queue length; data rate; loading; noise level; signal-to-noise ratio; and a number of received packets having foreign service set identifiers (SSID)s for example. These statistics may further be collected either in the aggregate for an entire WAP network or on a per link basis for each station to which the WAP is linked. Slightly less information is typically available for monitored channels, but many beacons provide in addition to channel, power, RSSI, SSID, radar and capabilities, additional information such as loading and number of active stations. Still further information is available if the monitoring WAP impersonates a station within the monitored network.

Figure 4:
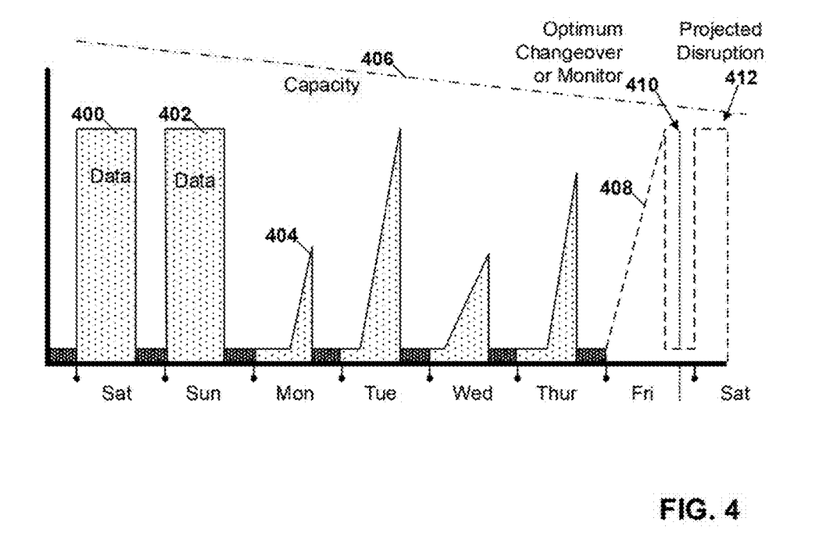
FIG. 4 is a graph showing projections of performance metrics by the channel tracker to predict channel changeovers or impending monitoring opportunities.

FIG. 4 is a graph showing projections of performance metrics by the channel tracker to predict channel changeovers or impending monitoring or changeover opportunities. The graph spans a one week interval on the horizontal axis. Historical performance metric records show data usage on Saturday-Thursday with high usage 400-402 on the weekend and moderate usage on weekdays 404. Historical performance metric records also show a gradually decreasing trendline for network capacity 406, which intersects anticipated data requirements on "Saturday". The predicted weekend disruption 412 of the current selected channel will necessitate a channel changeover. The optimum predicted time for changeover 410 and any monitoring requirements associated therewith, e.g. 60 seconds on a radar eligible channel is midnight (12:00 AM) on Friday as shown on the projected network activity trendline 408.

Figure 5:
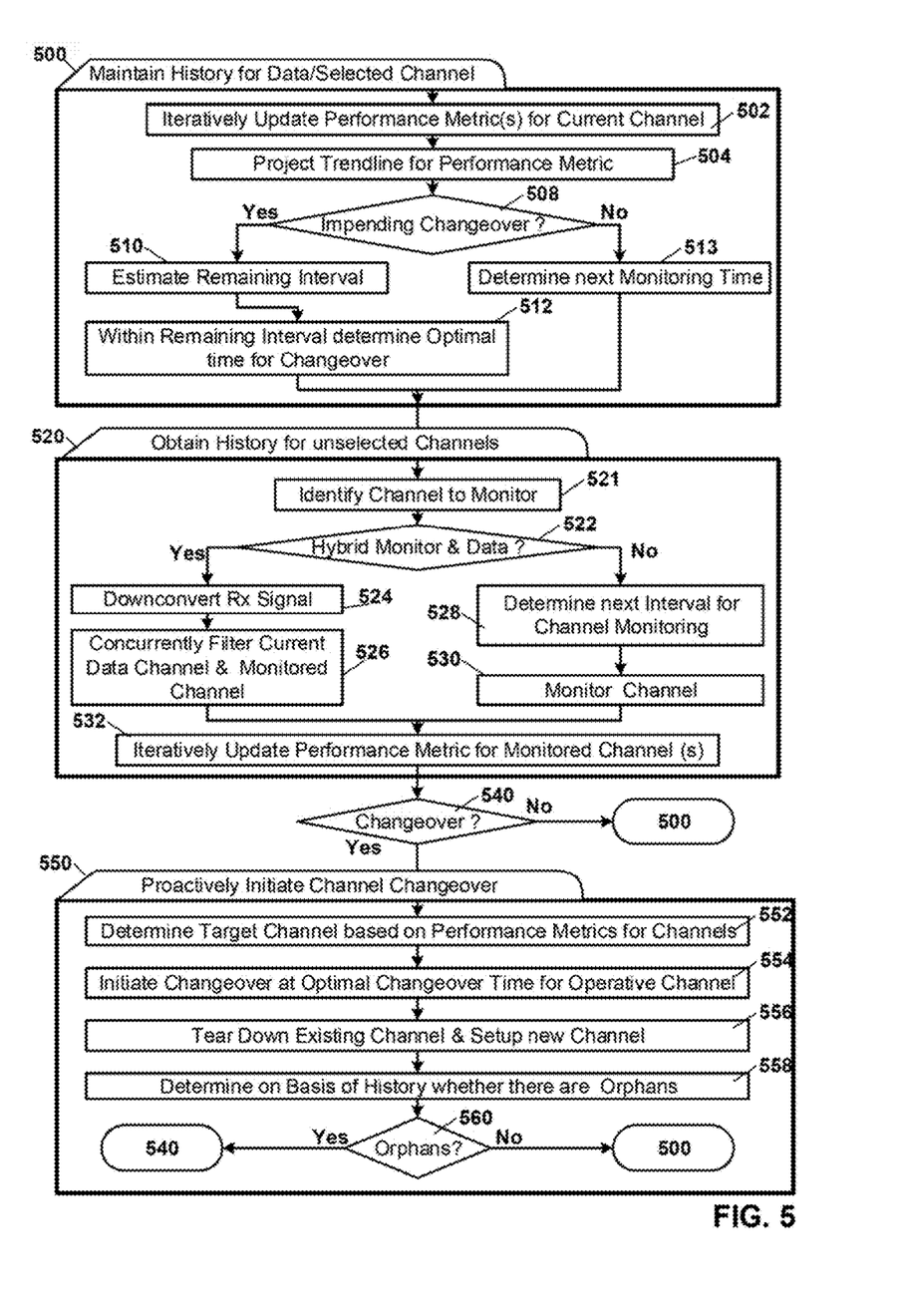
FIG. 5 is a process flow diagram of processes associated channel tracking in accordance with another embodiment of the current invention.

FIG. 5 is a process flow diagram of processes associated channel tracking in accordance with another embodiment of the current invention.

Processing begins in the first set of process blocks 500 in which a history of performance parameters/metrics for the selected data channel is tracked. In process 502 performance metrics for the current data channel are iteratively updated. Then in process 504 trendlines and projected intersections thereof are calculated. Next, in decision process 508 a determination is made as to whether trendlines indicate an impending channel changeover. If not control passes to process 513 in which an optimal time for monitoring without network disruption or slowdown is determined based on the stored performance parameters. Then control passes to the next set of process blocks 520. If a changeover is predicted then in process 510 the estimated time remaining to such changeover is determined. Next in process 512 a determination is also made based on the historical record as to what time within the remaining interval leading up to changeover is optimal for a changeover. Control then passes to the next set of process blocks.

In the next set of process blocks 520 histories for unselected channels are obtained by intermittent monitoring of the unselected channels. These parameters allow for intelligent selection of a-target channel when changeover is imminent. In process 521 a determination is made as to which channel to monitor. Next in decision process 522 a determination is made as to whether the receive path components support concurrent reception of the selected data channel together with the identified channel to monitor. If such concurrent reception capability exists then control passes to process 524 in which the received signal is down converted, and then in process 526 the data channel and monitored channel are concurrently filtered and processed. Alternately if a legacy receive path architecture dedicated to reception of a single channel is determined to exist in decision process 522 then control passes to process 528. In process 528 a determination is made as to the next interval for channel monitoring which will result in minimal impact on the network either in terms of outright disruption of network activity or noticeable degradation of network throughput. Once this interval is identified based on the historical records for the selected channel then in process 530 the identified channel is monitored. Next in process 532 the performance metrics for the monitored channel are updated.

Subsequently in decision process 540 a determination is made as to whether a changeover is to take place. If not then control returns to the first set 500 of process blocks. Alternately, if channel changeover is required control passes to the final set 550 of process blocks in which a channel changeover is proactively initiated. In process 552 a target channel for changeover is determined based on the aggregated performance metrics for all channels. Next in process 554 a changeover is initiated at an optimal changeover time for the operative channel as determined again based on the performance metrics for the currently selected channel, and further in an embodiment of the invention the target channel as well. Then in process 556 the existing channel is torn down and the new channel is setup. Next in process 558 a determination is made based on the historical record for the channel that was torn down, as to whether there are any orphans that are not associated with the newly setup channel. If there are, then in decision process 560 control is returned to decision process 540 for a subsequent changeover. Conversely, if no stations are orphaned after changeover then control returns to the first set 500 of process blocks.

The components and processes disclosed herein may be implemented as software, hardware, firmware, or a combination thereof, without departing from the scope of the Claimed invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless access point (WAP) apparatus comprising:
a plurality of antenna;
a plurality of components coupled to one another to form a plurality of multiple-input multiple-output (MIMO) transmit and receive paths, wherein each of the MIMO transmit and receive paths are coupled to a corresponding one of the plurality of antenna;
wherein the WAP is configured to support wireless communications with a plurality of station nodes on a selected one of a plurality of communication channels of an associated wireless local area network (WLAN), including:
  a first set of receive path components supporting at least two MIMO receive paths dedicated exclusively for MIMO reception of WLAN communications on the selected one of the plurality of communication channels;
  a second set of receive path components supporting a single MIMO receive path and configured to switch the single MIMO receive path between MIMO reception of WLAN communications on the selected one of the plurality of communication channels concurrently with the at least two MIMO receive paths of the first set of receive path components, and monitoring of communications on remaining ones of the plurality of communication channels; and
  a channel tracker coupled to the plurality of components;
wherein the WAP is further configured to:
  determine, via the channel tracker, a target channel for a prospective channel changeover among the remaining monitored ones of the plurality of communication channels while simultaneously monitoring communications on the remaining ones of the plurality of communication channels; and
  intermittently switch the single MIMO receive path without disruption of the WLAN communications between:
    monitoring the remaining ones of the plurality of communication channels, and
    receiving MIMO communications on the selected one of the plurality of communication channels.

2. The WAP apparatus of claim 1, wherein further:
the first set of receive path components include:
  a first tunable oscillator for downconverting received communications on the selected one of the plurality of communication channels; and
the second set of receive path components include:
  a second tunable oscillator for downconverting received communications on the remaining ones of the plurality of communication channels; and
  a switch for switchably coupling the single MIMO receive path of the 2nd set of receive path components to a selected one of the first tunable oscillator for receiving the MIMO communications on the selected one of the plurality of communication channels and to the second tunable oscillator for monitoring communications on the remaining ones of the plurality of communication channels.

3. The WAP apparatus of claim 1, wherein the plurality of components further comprise:
a plurality of mixers each coupled to a corresponding one of the MIMO receive paths of the first and second set of receive path components; and
at least two tunable oscillators switchably coupled to at least a one of the plurality of mixers coupled to the single MIMO receive path of the 2nd set of receive path components and configured for switching the single MIMO receive path between MIMO reception of WLAN communications on the selected one of the plurality of channels and monitoring communications on at least one of the remaining ones of the plurality of communication channels.

4. The WAP apparatus of claim 1, further comprising:
the channel tracker further configured to switch the single MIMO receive path of the 2nd set of receive path components to a remaining one of the plurality of communication channels for an extended interval of monitoring said channel for active radar, without interruption of WLAN communications.

5. A method for operating a wireless access point (WAP) comprising:
supporting wireless communications with a plurality of station nodes on a selected one of a plurality of communication channels of an associated wireless local area network (WLAN), the WAP comprising a plurality of antenna and a plurality of components, wherein the plurality of components are coupled to one another to form at least three multiple-input multiple-output (MIMO) transmit and receive paths, wherein each MIMO receive path is coupled to a corresponding one of the plurality of antenna;
intermittently switching one of the at least three MIMO receive paths between:
  receiving MIMO communications on the selected one of the plurality of communication channels, and monitoring communications on remaining ones of the plurality of communication channels;

maintaining MIMO communications on the selected one of the plurality of communication channels utilizing remaining ones of the at least three MIMO transmit and receive paths without disruption of WLAN communications while simultaneously monitoring communications on the remaining ones of the plurality of communication channels; and determining a target channel for a prospective channel changeover, wherein the target channel is one of the remaining ones of the plurality of communication channels associated with the WLAN being monitored.

6. The method for operating a WAP of claim 5, wherein the monitoring act further comprises:

monitoring at least one of the remaining one of the plurality of communication channels for active radar on at least one of the MIMO receive paths concurrently with receiving MIMO communications on the selected one of the plurality of communication channels on the remaining ones of the MIMO receive paths.

7. The method of claim 5, further comprising:

tracking performance metrics over time for at least the selected channel; and predicting based on the performance metrics tracked in the tracking act at least one of:
- a predicted time of an impending channel changeover requirement in which a projected demand for the selected channel exceeds a projected capacity thereof, and
- a predicted time of an impending monitoring interval for monitoring an unselected channel with relatively minimal disruption of communications on the selected channel.

8. The method of claim 5, further comprising:

tracking performance metrics over time for the remaining ones of the plurality of communication channels; and wherein determining the target channel for the prospective channel changeover is based at least on the tracked performance metrics for the remaining ones of the plurality of communication channels.

* * * * *